Jan. 19, 1937.　　　W. MELIN　　　2,068,426
VENTILATOR SWITCH
Filed May 14, 1934　　2 Sheets-Sheet 1

INVENTOR
William Melin,
ATTORNEYS

Jan. 19, 1937.  W. MELIN  2,068,426
VENTILATOR SWITCH
Filed May 14, 1934  2 Sheets-Sheet 2
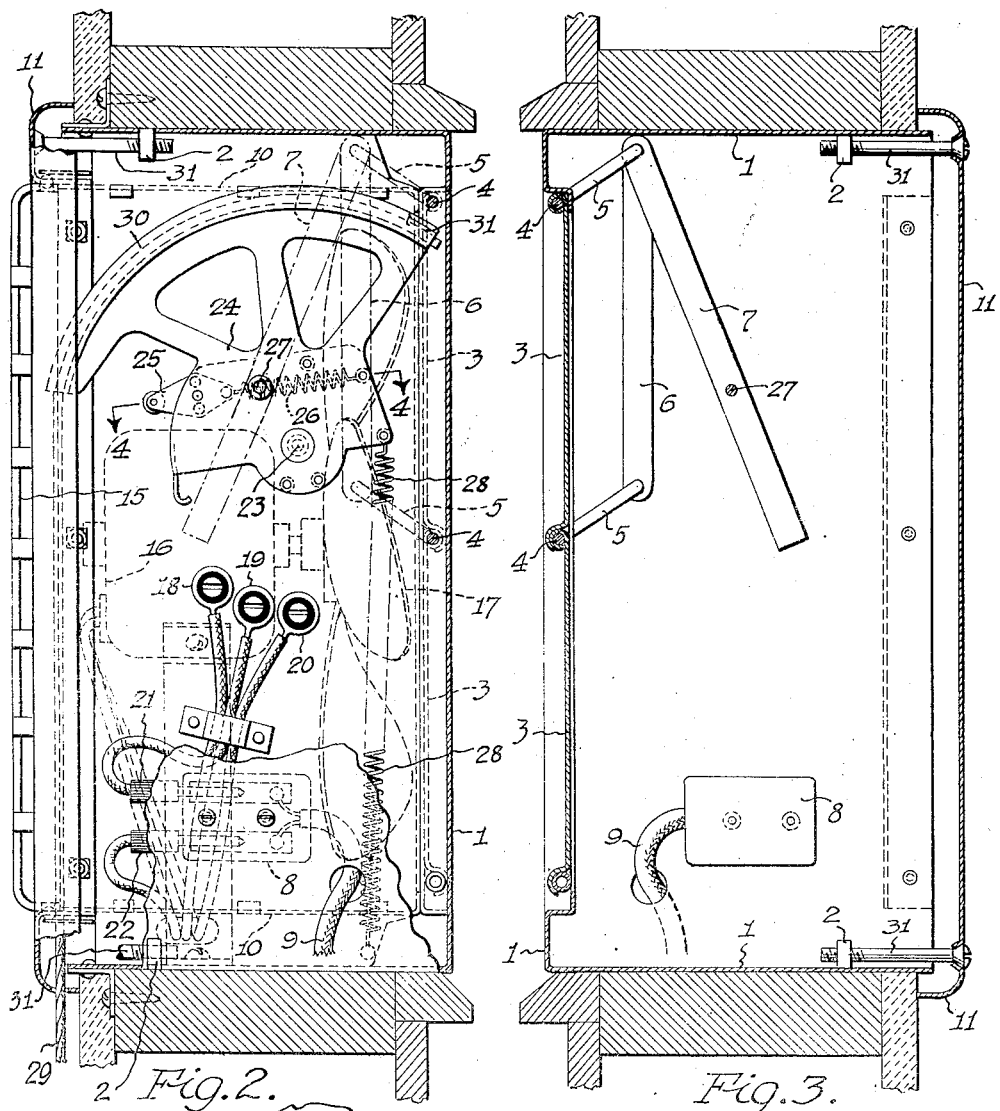
Fig. 2.
Fig. 3.
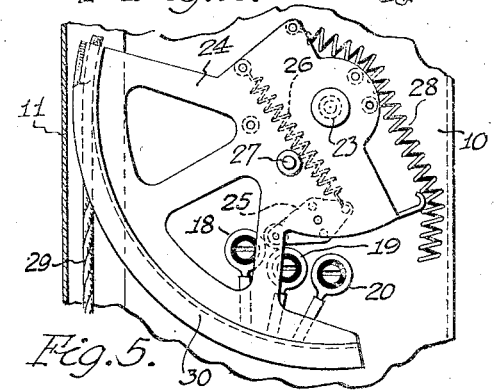
Fig. 5.
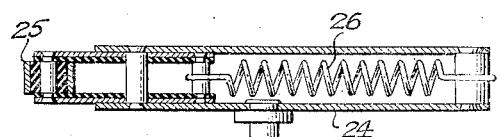
Fig. 4.
INVENTOR
William Melin,
BY
ATTORNEYS Patented Jan. 19, 1937

2,068,426

UNITED STATES PATENT OFFICE 2,068,426

VENTILATOR SWITCH

William Melin, Flint, Mich.

Application May 14, 1934, Serial No. 725,553

3 Claims. (Cl. 200—8)

This invention relates to ventilators for use in removing air from rooms or buildings and has for its object to provide a new and improved switch or electrical contact means for 5 energization of the fan motor which may be given any one of several positions and returned to its original starting position by a single pull cord in a manner somewhat analogous to the operation of a window shade.

10 Other objects and advantages will become hereinafter more fully apparent as reference is had to the accompanying drawings wherein my invention is illustrated, by way of example, and in which—

15 Figure 1 is a frontal view partially broken away for purposes of illustration;

Fig. 2 is a side elevation having the outer wall casing largely broken away and taken along the line 2—2 of Fig. 1;

20 Fig. 3 is a section substantially along the line 3—3 of Fig. 1 with the inner casing removed to show the louvre-operating linkage;

Fig. 4 is a detail section of the contact establishing terminal, taken along the line 4—4 of 25 Fig. 2;

Fig. 5 is a view of the control quadrant as shown in Fig. 2 but in a different position;

Figure 1:
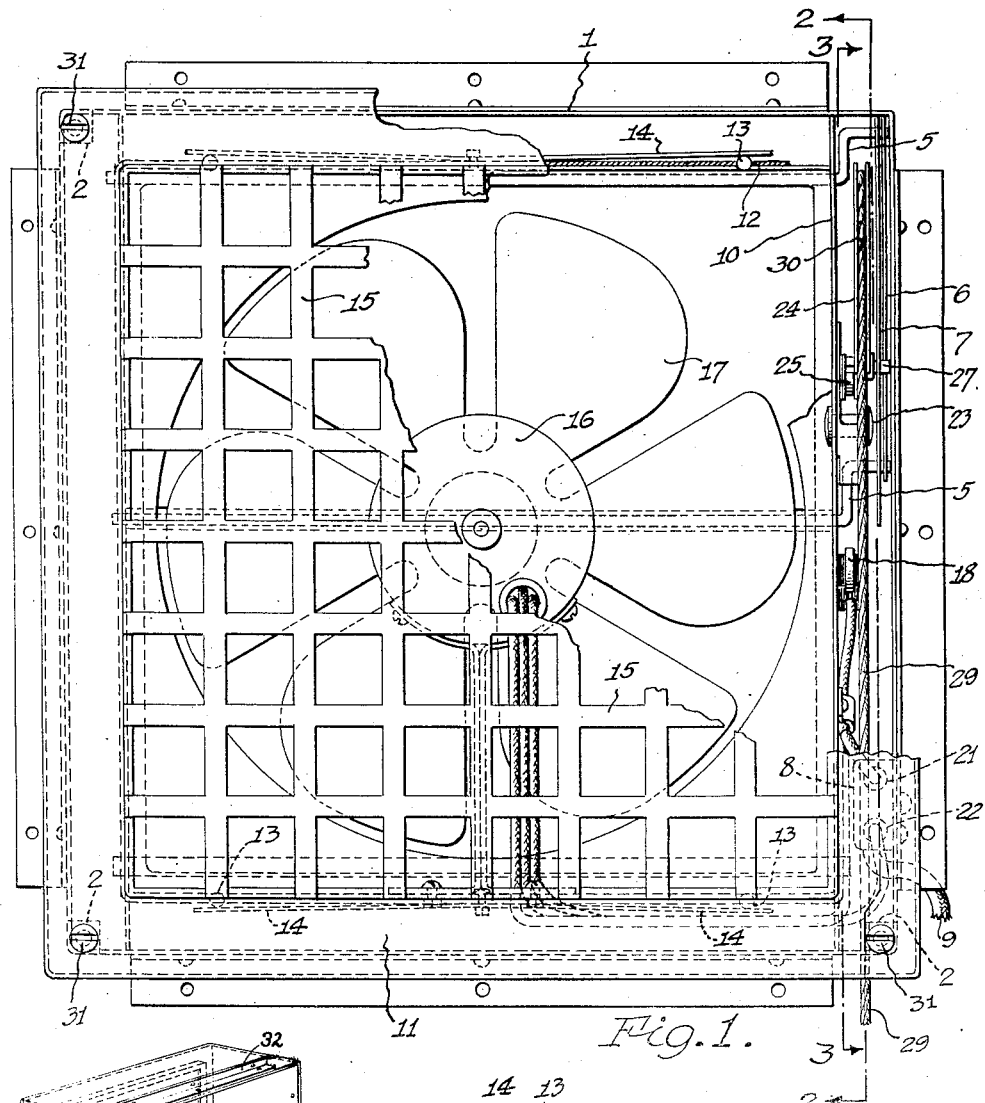
Figures 6, 7:
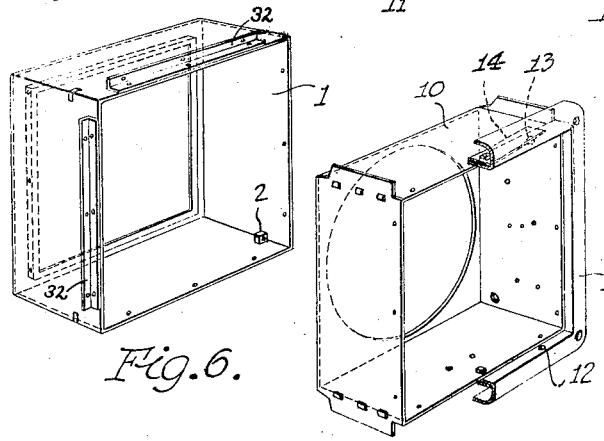
Fig. 6 is a perspective view of the outer casing.

30 Fig. 7 is a perspective view of the inner casing with the trim rail partially removed.

More particularly, I indicates an outer casing adapted for permanent placement in the wall of a building. This casing has gusset plates 2 at 35 each corner thereof of any desired size and threaded internally to serve as nuts. The casing 1 also has shutters 3 connected thereto by the hinge pins 4 which pins terminate in a crank arm 5, and the crank arms are connected by a 40 link 6 for simultaneous actuation by an actuating link 7 connected at one end to one of the crank arms and at its other end to a manually operable means as will be explained.

A terminal box or socket 8 connected by cables 45 9 to a source of electrical energy is secured to the interior of the casing 1.

An inner casing 10 adapted for placement in the casing 1 is provided with a trim rail 11 which covers the exposed edge of the casing 1 50 when in place. This rail 11 has openings 12 therethrough of slightly less diameter than that of the balls 13 fitting thereinto. Spring leaves 14 secured to the casing 10 hold these balls in place with an amount of resiliency. A grill 15 55 having holes corresponding to the holes 12 is held in place by the balls 13 and may be mounted and dismounted by simply pushing or pulling on the grill with the hand.

Within the casing 10 a fan motor 16 and fan 17 are permanently mounted. Three electric terminals 18, 19, 20 are fixed to a wall of the casing 10 and the two terminals 18 and 20 have lead wires connected to the fan motor 16. The terminal 19 has a lead wire terminating in a plug 21 for insertion into the socket 8. A second plug 22 has a lead wire connected to the motor 16 and is also insertable into the socket 8. By providing a contactor, as hereinafter explained, it will be seen that I have provided a multi-speed motor with an electrical circuit which may be broken so that the inner casing 10 may be readily dismounted with the motor, fan, grill and electrical connections. A single speed motor may be employed, if desired.

On the same wall of the casing 10 with the terminals 18, 19 and 20 I provide a fixed pivot 23 upon which a plate member 24 is rotatable. A contactor 25 comprising an arm having an insulated roller thereon is pivotally mounted on the member 24 and a spring 26 resists displacement of the contactor about its own pivot. A pin 27 integral with the plate 24 is attached to the outer end of the link 7 so that rotation of the plate member 24 actuates the shutters 3 and traverses the contactor into engagement with the terminal 18 whereupon it is displaced rotatably against its spring 26 and upon further rotation overrides terminal 18, coming into contact with terminal 19 and upon release of the pull means and spring 28 will rotate plate 24 in a reverse direction causing said contactor 25 to roll backward to position between terminals 18 and 19, closing the circuit, as shown in Fig. 5. The spring 28 is anchored to the inner casing to oppose rotation of the plate 27 and to maintain the contactor 25 in pressure contact with the terminals.

Rotation of the plate member 24 to the position described is preferably accomplished by the provision of a flexible cord or chain 29 which resides in an arcuate groove member 30 integral with the plate 24 and is secured to one end 31 thereof. The cord 29 extends through the outer casing and hangs in a position accessible to an operator. Further pull on the cord 29 from the position shown in Fig. 5 breaks the circuit established for one motor speed, and the contactor rides over the terminal 19 to a position where contact is established between terminals 19 and 20 and the shutters 3 are opened to a greater extent. Further pulling of the cord 29 causes the contactor 25 to override the terminal 20 whereupon the spring 26 causes the contactor to assume its normal or original position. Upon release of the cord 29 from this position, the spring 28 rotates the plate and contactor to their original position as shown in Fig. 2, and closes the shutters 3.

It will be noted that the terminals, contactor, actuator and shutter linkage are all housed between the walls of the inner and outer casing so that when the ventilator is assembled these parts are hidden from view and protected from dust.

In order to retain the inner casing in position I provide four bolts 31 which thread into the gusset plates 2. In order to remove the inner casing it is necessary to remove the bolts 31, slide the inner casing outwardly thereof a sufficient amount to permit insertion of the hand, pull the plugs 21 and 22 and lift the link 7 from its pivot pin 27. The grill 15 may be separately dismounted at any time.

It should be noted also that angle plates 32 are secured to the outer casing, preferably on all four sides. These plates constitute positioning means for the outer casing making it possible to make a proper installation even in a wall opening in which the fit is not perfect. In other words partial refilling of a prepared hole is usually not necessary, these angle plates serving as closures therearound and as additional means for anchoring the casing to the building.

Various changes may be made without departing from the spirit of my invention, and I therefore desire to be extended protection as defined by the appended claims.

What I claim is:—

1. In combination in a ventilator having an electrically driven fan and a switch for the electric circuits thereof, actuating means for said switch comprising a quadrant pivotally mounted near one corner thereof, a flexible pull means secured to another corner thereof and depending over a third corner, a spring pressed contactor carried by said quadrant, a plurality of fixed electric terminals adapted to be bridged by said contactor upon rotation of said quadrant by a given amount, said contactor serving as a means for preventing return of said quadrant, said contactor being adapted to override said terminals upon rotation by a further amount and to return therepast without serving as a stop upon reverse rotation of said quadrant, said flexible pull means comprising means for rotating said quadrant into a position of locking said contactor with said terminals and to traverse said contactor past said terminals, and a return spring for returning said quadrant to its original position upon release of said flexible pull means.

2. In combination in a ventilator having an electrically driven fan, an electric circuit for said fan having a switch therein comprising terminals and a rotatably mounted contactor, a flexible cord attached to said electrical contactor for actuation thereof to a circuit closing position, means for maintaining said contactor in pressure contact with its terminals after such actuation, said contactor upon further rotation by said cord breaking pressure contact with said terminals, and spring return means for reversely rotating said contactor to original position upon release of said cord.

3. In combination in a ventilator having an electrically driven fan, an electric circuit for said fan having a switch therein comprising terminals and a contactor pivotally mounted on a rotatable plate member, resilient means opposing displacement of said contactor with respect to said plate member, a pull cord for rotating said plate member whereby said contactor contacts one of said terminals, said plate member upon further rotation causing displacement of said contactor against said resilient means followed by a snap action of said contactor as contact is established also with a second one of said terminals whereby the electrical circuit is closed, said contactor being in a position of displacement with respect to said plate member during the maintenance of said circuit whereby immediate reverse rotation of said plate member is prevented, and a spring means connected to the casing of the ventilator and to said plate, said cord upon further displacement causing said contactor to override said second terminal and to return to normal position with respect to said resilient means, said spring means upon release of said cord rotating said plate member to return said contactor to its original starting position.

WILLIAM MELIN.